(12) United States Patent
Mukai

(10) Patent No.: US 6,614,232 B1
(45) Date of Patent: Sep. 2, 2003

(54) BATTERY MANAGEMENT CIRCUIT

(75) Inventor: Norimitsu Mukai, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/069,110

(22) PCT Filed: Sep. 1, 1999

(86) PCT No.: PCT/JP99/04731

§ 371 (c)(1),
(2), (4) Date: Feb. 27, 2002

(87) PCT Pub. No.: WO01/17053

PCT Pub. Date: Mar. 8, 2001

(51) Int. Cl.[7] ............................................. G01N 27/416
(52) U.S. Cl. ...................................... 324/426; 324/427
(58) Field of Search ................................ 324/426, 427; 320/106, 116, 110, 125, 132, 137, 138

(56) References Cited

U.S. PATENT DOCUMENTS

| | | | |
|---|---|---|---|
| 5,635,813 A | 6/1997 | Shiga et al. | 320/106 |
| 5,654,623 A | 8/1997 | Shiga et al. | 320/106 |
| 5,739,669 A | 4/1998 | Brülhardt et al. | 320/128 |
| 6,014,012 A | * 1/2000 | Murao et al. | 320/116 |
| 6,181,103 B1 | * 1/2001 | Chen | 320/106 |

FOREIGN PATENT DOCUMENTS

| | | |
|---|---|---|
| JP | 6-121463 | 4/1994 |
| JP | 6-168056 | 6/1994 |
| JP | 7-007858 | 1/1995 |
| JP | 7-162931 | 6/1995 |
| JP | 7-176333 | 7/1995 |
| JP | 7-201370 | 8/1995 |
| JP | 8-220199 | 8/1996 |
| JP | 9-135530 | 5/1997 |
| JP | 9-139236 | 5/1997 |
| JP | 11-38106 | 2/1999 |
| JP | 11-135155 | 5/1999 |
| JP | 11-136867 | 5/1999 |

* cited by examiner

Primary Examiner—Lawrence Luk
(74) Attorney, Agent, or Firm—Arent Fox Kintner Plotkin & Kahn

(57) ABSTRACT

A battery management circuit allows a communication circuit to communicate with a CPU of an intelligent battery. The communication circuit serves to obtain a battery information signal from the CPU. A battery controlling circuit is allowed to control the supply of the electric power from the intelligent battery in view of the battery information, such as the electric power remaining in the battery, the voltage level of the supplied electric power. When a deficiency is found in the battery information signal, the battery controlling circuit switches over the supply and cutoff of the electric power based on the voltage level detected at a voltage detector circuit. The supply of the electric power can be controlled without the battery information signal. Even when the defect is found in the battery information signal, the supply of the electric power can be maintained as long as the voltage level is normal. The interruption of related operations can be deferred.

6 Claims, 3 Drawing Sheets

BATTERY MANAGEMENT CIRCUIT

BACKGROUND OF THE INVENTION

1. Field of the Invention

The present invention relates to a portable or cordless electronic apparatus designed to operate based on the electric power supplied from a battery.

2. Description of the Prior Art

Ones often employ handy terminals when they intend to conduct inventory management or suppliance of products in shops and stores. Any suitable software program is installed in the respective handy terminals for realizing the inventory management or suppliance of products. A controller unit including a primary CPU (central processing unit) is incorporated within the enclosure of the handy terminal. The primary CPU implements the software program in the handy terminal. The primary CPU usually operates based on the electric power supplied from a secondary battery coupled to the handy terminal.

In general, the instructions from the software program induces the storing process of data in the handy terminal. If the supply of the electric power is somehow terminated during the operation of the primary CPU, because of less electric power remaining in the battery, for example, the primary CPU is forced to discontinue the operation without conducting the storing process of data. The data may be lost and cannot be recovered. If the electric power remaining in the battery can be monitored, the primary CPU is allowed to conduct the storing process of the input data prior to termination of the electric power from the battery. The data can be prevented from being lost.

A so-called intelligent battery is proposed in the technical field of a portable electronic apparatus. The intelligent battery includes a dedicated CPU and a secondary battery. The dedicated CPU is designed to obtain the information on the status of the battery, such as the remaining electric power in the battery, the voltage level of the output electric power, and the like. A battery information signal specifying the status of the battery is supplied to the primary CPU in the controller unit of the portable electronic apparatus through a communication path, such as a serial interface, established in parallel with a path for the electric power. The primary CPU in the controller unit is allowed to easily monitor the amount of the electric power remaining in the battery. The primary CPU is thus allowed to reliably conduct the storing process of data prior to the exhaustion of the electric power in the battery.

Assume that any deficiency takes place in the battery information signal, due to a defect of the interface for exchanging the battery information signal, for example. The primary CPU of the controller unit cannot monitor anymore the status of the battery or the remaining electric power in the battery. In this case, the portable electronic apparatus may preferably be turned off, subsequent to the storing process of data, immediately after the deficiency has been detected. On the other hand, even in the case where any deficiency is detected in the battery information signal, the electric power of the appropriate voltage level may be supplied to the controller unit of the portable electronic apparatus from the battery. It is very convenient to the user to defer the switch-off of the portable electronic apparatus until the user finishes a series of related operations in the portable electronic apparatus.

SUMMARY OF THE INVENTION

It is accordingly an object of the present invention to provide a battery management circuit capable of managing an intelligent battery, possibly without interrupting a series of related operations, even when any deficiency is found in a battery information signal.

According to the present invention, there is provided a battery management circuit comprising: a communication circuit receiving a battery information signal specifying a status of a battery; a voltage detector circuit detecting a voltage level of an electric power from the battery; and a battery controlling circuit reading out the voltage level detected at the voltage detector circuit when a defect is detected in the battery information signal.

The battery management circuit allows the communication circuit to communicate with a dedicated CPU (central processing unit) of an intelligent battery. The communication circuit serves to obtain a battery information signal from the dedicated CPU. The battery controlling circuit is allowed to control the supply of the electric power from the intelligent battery in view of the battery information, such as the electric power remaining in the battery, the voltage level of the supplied electric power, and the like. On the other hand, when a defect or deficiency is found in the battery information signal, the battery controlling circuit switches over the supply and cutoff of the electric power based on the voltage level detected at the voltage detector circuit. In this manner, the supply of the electric power can be controlled without the battery information signal. Even when the defect is found in the battery information signal, the supply of the electric power can be maintained as long as the voltage level is normal. The interruption of the operations can be deferred.

The battery controlling circuit may output an alarm signal in response to detection of the defect in the battery management circuit. Any alarm sound or display can be generated based on the alarm signal for specifying the defect of the battery information signal. Even when an apparatus receiving the electric power keeps operating in a normal manner, the user of the apparatus is reliably informed of the defect of the battery information signal. The user may cut out the supply of the electric power or turn off the apparatus at a subsequent break of related operations. The intelligent battery may thereafter be replaced with a full-charged one, or be fixed.

The aforementioned battery management circuit may be utilized in any types of electronic apparatuses, including a portable electronic apparatus such as a handy terminal, a notebook or hand-held personal computer, and the like, which are designed to operate based on the electric power supplied from an intelligent battery.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
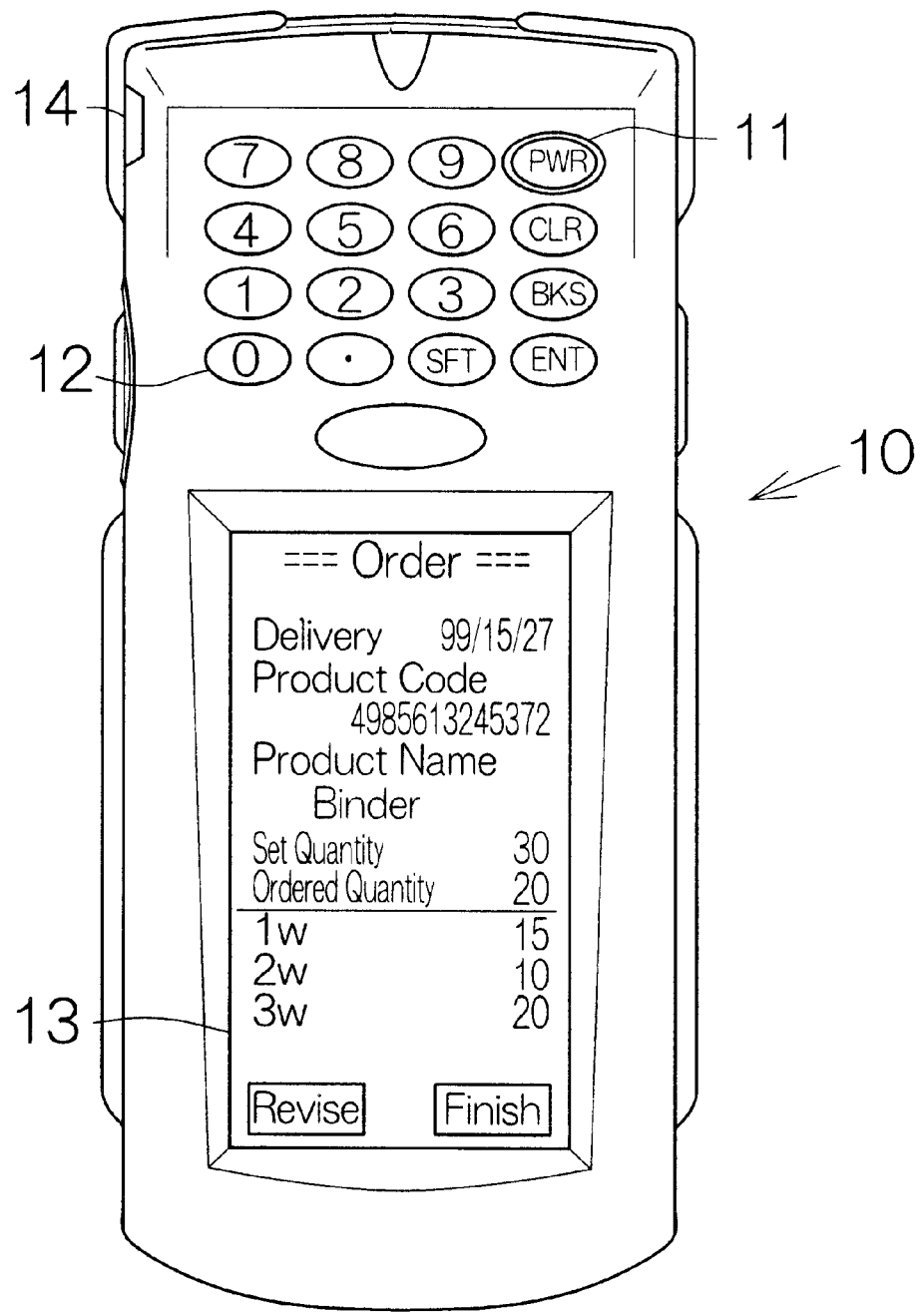
FIG. 1 is a plan view schematically illustrating a handy terminal.

FIG. 1 illustrates a handy terminal 10 as an example of a portable or cordless electronic apparatus. The handy terminal 10 includes a power switch button 11 and operation keys 12. A user operates the power switch button 11 to turn on or off the handy terminal 10. A user manipulates the operation keys 12 to input information such as numeral values into the handy terminal 10. The handy terminal 10 may be utilized to conduct inventory management or suppliance of products in shops and stores based on a POS (point-of-sales) system, for example. When a user intends to order products, the handy terminal 10 is first turned on, so that the user is allowed to input the order information, such as the date of delivery, product codes, and the quantity of the products, through manipulation of the operation keys 12. A bar code reader, not shown, may be employed, in place of the operation keys 12, to input the product codes into the handy terminal 10, for example.

The handy terminal 10 incorporates a liquid crystal display (LCD) 13 for displaying the input information, and a light emitting diode (LED) 14 designed to blink for alarming a defect in the power supply, as described later in detail. When the order information is displayed on the screen of the LCD 13, for example, the user is then allowed to register the order information in the handy terminal 10 after visual confirmation of the order information. The registered order information may be transmitted to a host computer, not shown, through an infrared communication, PHS (portable handy phone system), or the like. Accordingly, products can be shipped in accordance with the order information.

Figure 2:
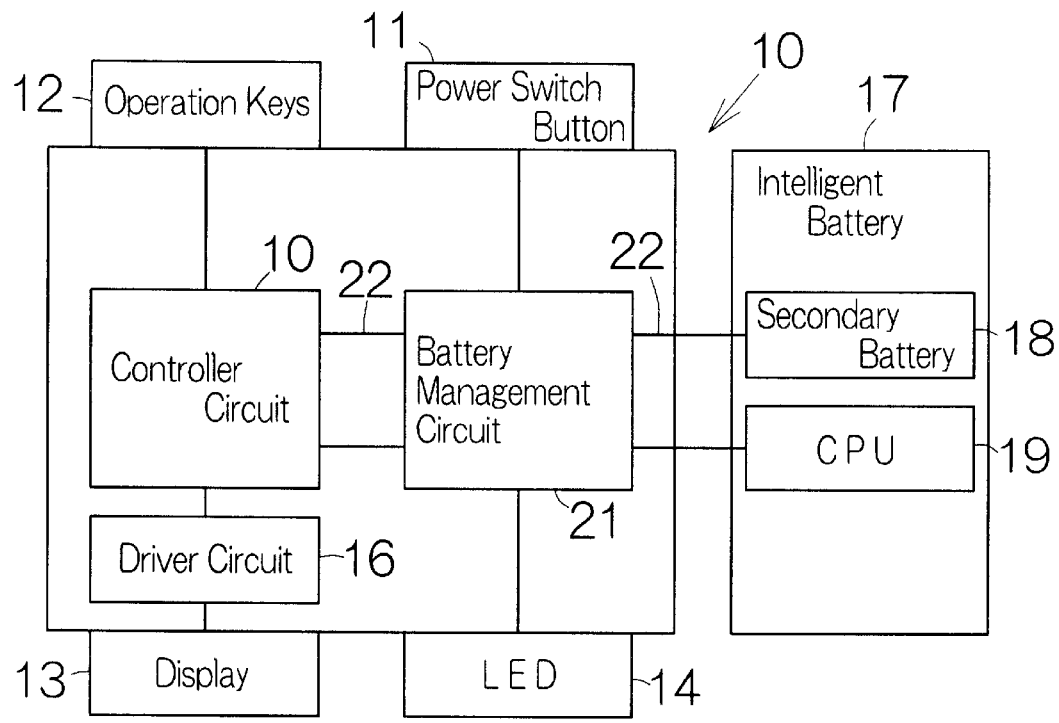
FIG. 2 is a block diagram schematically illustrating the circuit structure of the handy terminal.

FIG. 2 schematically illustrates the circuit structure of the handy terminal 10. The handy terminal 10 includes a controller circuit 15 incorporating a primary CPU (central processing unit) and a memory. The primary CPU of the controller circuit 15 implements software programs for achieving the inventory management or suppliance of products. The software programs may be obtained from the memory. The primary CPU may receive signals from the respective operation keys 12 in implementing the software programs. The information based on the signals and the result of the processing of the primary CPU may be displayed on the screen of the LCD 13. A driver circuit 16 controls the display on the LCD 13.

The electric voltage for operating the controller circuit 15 is supplied from an intelligent battery 17. The intelligent battery 17 includes a secondary or rechargeable battery 18 and a dedicated CPU 19. The secondary battery 18 can be coupled to an AC adapter, not shown, which in turn can be connected to an outlet, for example. The AC adapter is in general employed to recharge the secondary battery 18. The CPU 19 is designed to obtain the battery information such as the remaining electric power in the battery as well as the voltage level of the output electric power. The CPU 19 generates a battery information signal specifying the status of the secondary battery 18 based on the obtained battery information.

A battery management circuit 21 interposed between the controller circuit 15 and the secondary battery 18. The battery management circuit 21 is designed to connect or disconnect a power supply path 22 extending from the secondary battery 18 from the controller circuit 15. In order to realize the supply and shut-off of the electric power, the battery management circuit 21 monitors the action of the power switch button 11 and the status of the secondary battery 18. The result of monitoring is supplied to the controller circuit 15. The battery management circuit 21 controls the aforementioned blinks of the LED 13.

Figure 3:
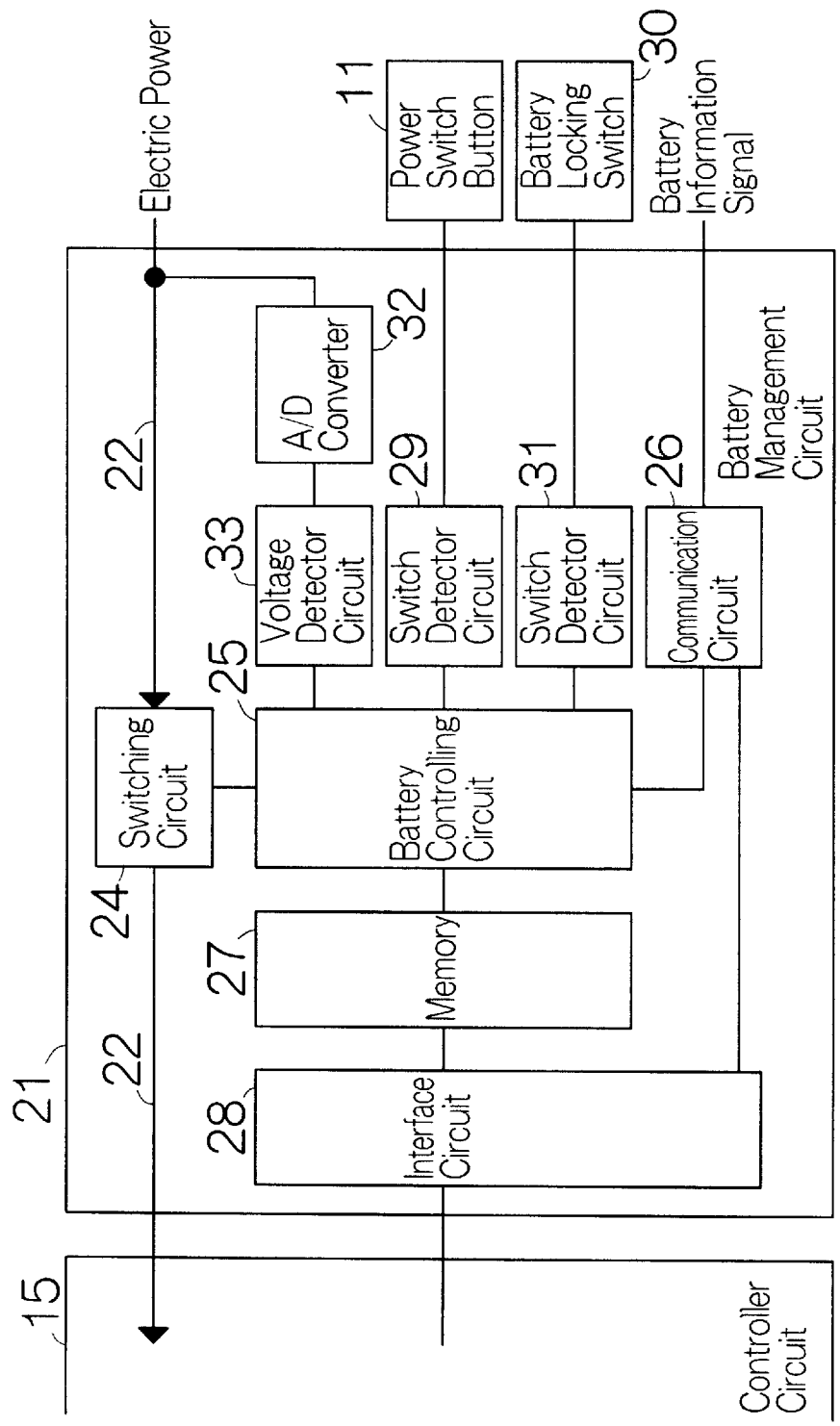
FIG. 3 is a block diagram schematically illustrating the structure of a battery management circuit.

As shown in FIG. 3, the battery management circuit 21 includes a switching circuit 24 for connecting and disconnecting the power supply path 22 extending from the secondary battery 18 from the controller circuit 15. A battery controlling circuit 25 is designed to control the on and off operations of the on/off switching circuit 24.

A communication circuit 26 is connected to the battery controlling circuit 25. The communication circuit 26 is designed to establish a communication between the battery controlling circuit 25 and the CPU 19 of the intelligent battery 17 based on a predetermined protocol. The communication circuit 26 supplies the battery information signal from the CPU 19 to the battery controlling circuit 25. The battery controlling circuit 25 is designed to request the communication circuit 26 to obtain the battery information signal at predetermined intervals. The battery controlling circuit 25 may register the received battery information signal into a memory 27.

The battery information signal in the memory 27 may be supplied to the controller circuit 15 through the operation of an interface circuit 28. The controller circuit 15 may anytime request the interface circuit 28 to obtain the battery information signal. Otherwise, the interface circuit 28 may obtain the battery information signal directly from the communication circuit 26.

First and second switch detector circuits 29, 31 are connected to the battery controlling circuit 25. The first switch detector circuit 29 is designed to detect the switch-on and -off operations of the power switch button 11. The second switch detector circuit 31 is designed to detect the switch-on and -off operations of a battery locking switch 30. The battery locking switch 30 is designed to output a predetermined signal in response to the attachment and detachment of the intelligent battery 17. In addition, a voltage detector circuit 33 is connected to the battery controlling circuit 25. The voltage detector circuit 33 is designed to detect the voltage level of the electric power based on digital signals supplied from an analog/digital (A/D) converter 32. The A/D converter 32 is designed to output the digital signals corresponding to the voltage level of the power supply path 22.

When the intelligent battery 17 is mounted on the handy terminal 10, the signal of the battery locking switch 30 is supplied to the switch detector circuit 31. The switch detector circuit 31 boots the battery controlling circuit 25 in response to the attachment of the intelligent battery 17. The battery controlling circuit 25 then requests the communication circuit 26 to obtain the battery information signal. The communication circuit 26 establishes the communication with the CPU 19 of the intelligent battery 17 so as to obtain the battery information signal.

Figure 4:
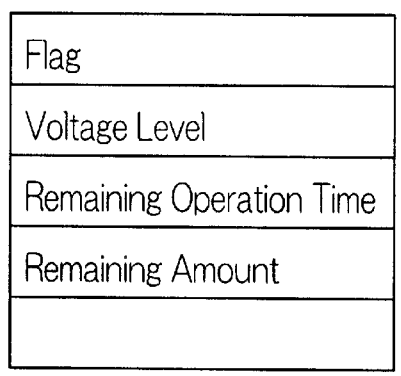
FIG. 4 is a schematic view illustrating the structure of a memory.

When the battery controlling circuit 25 receives the battery information signal from the communication circuit 26, the battery controlling circuit 25 updates the battery information in the memory 27. As shown in FIG. 4, the status of the secondary battery 18 specified in the battery information signal is written into a specific section of the memory 27. The battery information may include the voltage level, the remaining operation time, the remaining amount of the electric power, and the like. The battery controlling circuit 25 obtains the battery information signal continuously at the predetermined intervals. The battery information is every time written into the memory 27 based on the obtained battery information signal. When the intelligent battery 17 is detached, the operation of the battery controlling circuit 25 is terminated.

During the aforementioned operation, the battery controlling circuit 25 compares the remaining amount of the electric power specified in the obtained battery information signal with a predetermined lower threshold. When the remaining amount takes a value below the predetermined lower threshold, the battery controlling circuit 25 sets a first caution flag in the specific section of the memory 27. Establishment of this first caution flag specifies the less amount of electric power remaining in the secondary battery 18, in other words, the anticipation of the exhaustion of the electric power in the secondary battery 18. The predetermined lower threshold of the remaining amount may be set at a level equal to 5% of the full charge of the secondary battery 18, for example.

Likewise, the battery controlling circuit 25 compares the voltage level of the output electric power specified in the obtained battery information signal with a predetermined lower voltage threshold. When the voltage level of the secondary battery 18 takes a value below the predetermined lower voltage threshold, the battery controlling circuit 25 sets the first caution flag in the specific section of the memory 27 as described above. The predetermined lower voltage threshold may be set at a level corresponding to the remaining amount of the electric power equal to 5% of the full charge of the secondary battery 18, for example.

Here, assume that the power switch button 11 is operated. The signal of the power switch button 11 is supplied to the switch detector circuit 29. The switch detector circuit 29 informs the battery controlling circuit 25 of the switch-on operation of the power switch button 11. The battery controlling circuit 25 first checks the specific section of the memory 27. If the aforementioned first caution flag is set in the specific section, the battery controlling circuit 25 maintains the disconnection of the switching circuit 24. The handy terminal 10 is not turned on. This operation serves to reliably prevent the controller circuit 15 from suffering from any improper operation due to a lower voltage of the electric power.

If the voltage level of the secondary battery 18 exceeds the predetermined lower voltage threshold, the battery controlling circuit 25 allows the connection of the switching circuit 24. The controller circuit 15 is allowed to receive the electric power from the secondary battery 18. The CPU of the controller circuit 15 can thus implement the software programs. The controller circuit 15 periodically checks the battery information of the secondary battery 18 specified in the battery information signal.

If the controller circuit 15 detects the establishment of the aforementioned first caution flag, the controller circuit 15 operates to display an alarm image or massage, specifying the anticipation of the exhaustion of the electric power, on the screen of the LCD 13. At the same time, the controller circuit 15 effects the storing process of the data which is input through the operation keys 12 and/or obtained based on the processing of the CPU prior to the display of the massage. The data may be stored in the memory. The controller circuit 15 thus prepares for shutdown of the handy terminal 10. When the data has completely been stored in the memory, the CPU is allowed to terminate its operation. The battery controlling circuit 25 thereafter allows the disconnection of the switching circuit 24. The handy terminal 10 is thus turned off.

Next, assume that a defect or deficiency is detected in the battery information signal output from the communication circuit 26. Such a defect may be caused by malfunction of the communication circuit 26. When the battery information signal is lost, for example, the battery controlling circuit 25 sets a second caution flag in the specific section of the memory 27. Establishment of the second caution flag specifies the defect of the battery information signal. As long as the second caution flag is maintained, the battery controlling circuit 25 keeps obtaining the voltage value detected at the voltage detector circuit 33. The obtained voltage value is written into the specific section of the memory 27.

When the battery information signal is not correctly supplied to the controller circuit 15, because of a defect of the battery information signal, it is impossible to monitor the status of the secondary battery 18. In general, it is preferable to shut off the switching circuit 24 after the controller circuit 15 has effected the storing process of data. If the controller circuit 15 keeps operating without receiving any information on the status of the secondary battery 18, there is a possibility that the supply of the electric power is unexpectedly cut off prior to completion of the storing process. On the other hand, if the controller circuit 15 is turned off immediately after the defect of the battery information signal has been detected, a series of related operations may be interrupted. This interruption induces inconvenience to the user of the handy terminal 10.

The battery controlling circuit 25 is allowed to receive the voltage level of the power supply path 22 with the assistance of the voltage detector circuit 33 in the aforementioned battery management circuit 21 even when the battery information signal is lost, for example, The voltage level of a higher accuracy can be stored in the memory 27. The battery controlling circuit 25 is allowed to effect the aforementioned comparison between the voltage level and the predetermined lower voltage threshold based on the stored voltage level. If the voltage level exceeds the predetermined lower voltage threshold, the battery controlling circuit 25 maintains the connection of the switching circuit 24. Accordingly, the controller circuit 15 is allowed to keep operating, as long as the voltage level is normal at the voltage detector circuit 33, even when the status of the secondary battery 18 cannot be monitored based on the battery information signal. The user is released from interruption of a series of related operations. The operability improves.

In addition, the battery controlling circuit 25 is designed to output an alarm signal to the LED 14 in response to detection of the defect in the battery information signal. The LED 14 accordingly blinks. Even when the controller circuit 15 keeps operating in a normal manner, the user of the handy terminal 10 is informed of the defect of the battery information signal. The controller circuit 15 may set the second caution flag and simultaneously operate to display on the screen of the LCD 13 an alarm image or message specifying the defect of the battery information signal. The user may turn off the handy terminal 10 at a subsequent break of the related operations. The intelligent battery 17 may thereafter be replaced with a full-charged one. Or, the handy terminal 10.may thereafter be fixed.

If the voltage level detected at the voltage detector circuit 33 falls below the predetermined lower voltage threshold, the battery controlling circuit 25 sets the first caution flag in the specific section of the memory 27. The controller circuit 15 thereafter operates to display the alarm message as described above. At the same time, the controller circuit 15 effects the storing process of the data which is input through the operation keys 12 and/or obtained based on the processing of the CPU prior to the display of the massage. The data may be stored in the memory. The controller circuit 15 thus prepares for shutdown of the handy terminal 10. When the data has completely been stored in the memory, the CPU is allowed to terminate its operation. The battery controlling circuit 25 thereafter allows the disconnection of the switching circuit 24. The handy terminal 10 is thus turned off.

What is claimed is:

1. A battery management circuit comprising:

a communication circuit receiving a battery information signal specifying a status of a battery;

a voltage detector circuit detecting a voltage level of an electric power from the battery; and a battery controlling circuit reading out the voltage level detected at the voltage detector circuit when a defect is detected in the battery information signal.

2. The battery management circuit according to claim 1, wherein said battery controlling circuit outputs an alarm signal in response to detection of the defect.

3. The battery management circuit according to claim 2, wherein said defect is a loss of the battery information signal reaching the battery controlling circuit.

4. A portable electronic apparatus comprising:

a communication circuit receiving a battery information signal specifying a status of a battery;

a voltage detector circuit detecting a voltage level of an electric power from the battery; and a battery controlling circuit reading out the voltage level detected at the voltage detector circuit when a defect is detected in the battery information signal.

5. The portable electronic apparatus according to claim 4, wherein said battery controlling circuit outputs an alarm signal in response to detection of the defect.

6. The portable electronic apparatus according to claim 5, wherein said defect is a loss of the battery information signal reaching the battery controlling circuit.

\* \* \* \* \*